United States Patent
Imura

(10) Patent No.: US 7,471,391 B2
(45) Date of Patent: Dec. 30, 2008

(54) METHOD FOR CALIBRATING SPECTRAL CHARACTERISTICS OF A SPECTRAL ANALYZER AND A SPECTRAL ANALYZER APPLYING SAID METHOD

(75) Inventor: Kenji Imura, Toyohashi (JP)

(73) Assignee: Konica Minolta Sensing, Inc., Osaka (JP)

( * ) Notice: Subject to any disclaimer, the term of this patent is extended or adjusted under 35 U.S.C. 154(b) by 148 days.

(21) Appl. No.: 11/474,902

(22) Filed: Jun. 26, 2006

(65) Prior Publication Data

US 2006/0290929 A1   Dec. 28, 2006

(30) Foreign Application Priority Data

Jun. 28, 2005    (JP) .............................. 2005-188824

(51) Int. Cl.
*G01J 3/28* (2006.01)
(52) U.S. Cl. ..................................................... 356/326
(58) Field of Classification Search .......... 356/326–328
See application file for complete search history.

(56) References Cited

U.S. PATENT DOCUMENTS 6,876,448 B2 * 4/2005 Imura et al. .................. 356/326
2007/0263213 A1 * 11/2007 Stedman ...................... 356/328

FOREIGN PATENT DOCUMENTS

JP    2000-205955    7/2000

* cited by examiner

*Primary Examiner*—Kara E Geisel
(74) *Attorney, Agent, or Firm*—Brinks Hofer Gilson & Lione

(57) ABSTRACT

The differences between the center wavelength and half bandwidth of the spectral sensitivity of each pixel of a sensor array in a spectral analyzer to be calibrated and the preprovided respective standard values of the center wavelength and the half bandwidth are expressed as functions of a pixel number (linear functions), and coefficients that define the functions are determined based on the pixel outputs of the sensor array obtained by measuring predetermined wavelength standards. The center wavelength and half bandwidth of each pixel are estimated from the differences obtained from the functions with the determined coefficients and the standard values.

5 Claims, 10 Drawing Sheets

METHOD FOR CALIBRATING SPECTRAL CHARACTERISTICS OF A SPECTRAL ANALYZER AND A SPECTRAL ANALYZER APPLYING SAID METHOD

This application is based on the application No. 2005-188824 filed in Japan, the contents of which are hereby incorporated by reference.

BACKGROUND OF THE INVENTION

1. Field of the Invention

The present invention relates to a spectral analyzer, particularly relates to a method for calibrating spectral characteristics of a spectral analyzer which analyzes whole measuring wavelength range simultaneously.

2. Description of the Related Art

As a spectral analyzer that measures the spectral distribution of incident light, a spectral analyzer has previously been known that has a polychromater or the like and is capable of simultaneously measuring all the wavelengths in the measurement range. Examples of typical wavelength calibration methods for the spectral analyzer include the following method: The spectral sensitivity of each pixel (light receiving element) is approximated by a simple mathematical function such as a Gaussian function and further, the center wavelength and the half bandwidth that determine the profile of the mathematical function are approximated as a function of pixel number. Then, the optimal coefficients for determining the function of pixel number giving the center wavelength and the half bandwidth are obtained by measuring a plurality of wavelength standards having a known spectral distribution. That is, the coefficients are obtained so that the output of each pixel calculated on the basis of the spectral sensitivity by the mathematical function given by the center wavelength and the half bandwidth based on the function of pixel number and the known spectral distribution of the wavelength standards approximates to the measured output, and the spectral sensitivity based on the mathematical function with the coefficients is determined to be the spectral sensitivity of each pixel.

However, this conventional wavelength calibration method has the following problems (1) to (3):

(1) FIGS. 9 and 10 show the nonlinearities, with respect to the pixel number, of the center wavelengths and the half bandwidths of the spectral sensitivities of the pixels, respectively. As shown in these figures, the nonlinearities of the center wavelengths and the half bandwidths with respect to the pixel number are considerably large, and to approximate the spectral sensitivities by the function of pixel number, high-order functions defined by a considerable number of coefficients are required. To accurately determine the considerable number of coefficients, a considerable number of wavelength standards corresponding to the number of coefficients are required.

(2) Since high-order (complicated) functions are employed for approximation, the accuracy of the approximation degrades steeply in the extrapolated regions outside the wavelength standards (both ends of the sensor array).

(3) The method of prior art is not applicable when the spectral sensitivities of the pixels cannot be approximated by simple mathematical functions such as Gaussian functions.

The present invention is made in view of the above-mentioned problems, and an object thereof is to provide a spectral analyzer capable of easily (quickly) and accurately calibrating the spectral sensitivities of the pixels in the spectral analyzer using simpler approximation functions and a smaller number of wavelength standards, and a wavelength calibration method for the spectral analyzer.

SUMMARY OF THE INVENTION

A method for calibrating spectral characteristics of a spectral analyzer provided with an incident slit, a light sensor comprising multiple pixels, and a dispersing and imaging element producing a dispersed image of said incident slit on said sensor array, said method comprising steps of; determining coefficients which defines functions approximating a relation of the differences of the center wavelength and/or the half bandwidth of each pixel in said light sensor from the center wavelength and/or the half bandwidth of the standard spectral characteristics of each pixel to the pixel number by measuring wavelength standards, estimating the center wavelength and/or the half bandwidth of each pixel based on said differences given by said functions with the coefficients determined and said standard spectral characteristics.

In the following description, like parts are designated by like reference numbers throughout the several drawings.

DETAILED DESCRIPTION OF THE PREFERRED EMBODIMENT (General Description of the Calibration Method of the Spectral Analyzer)

Figure 1:
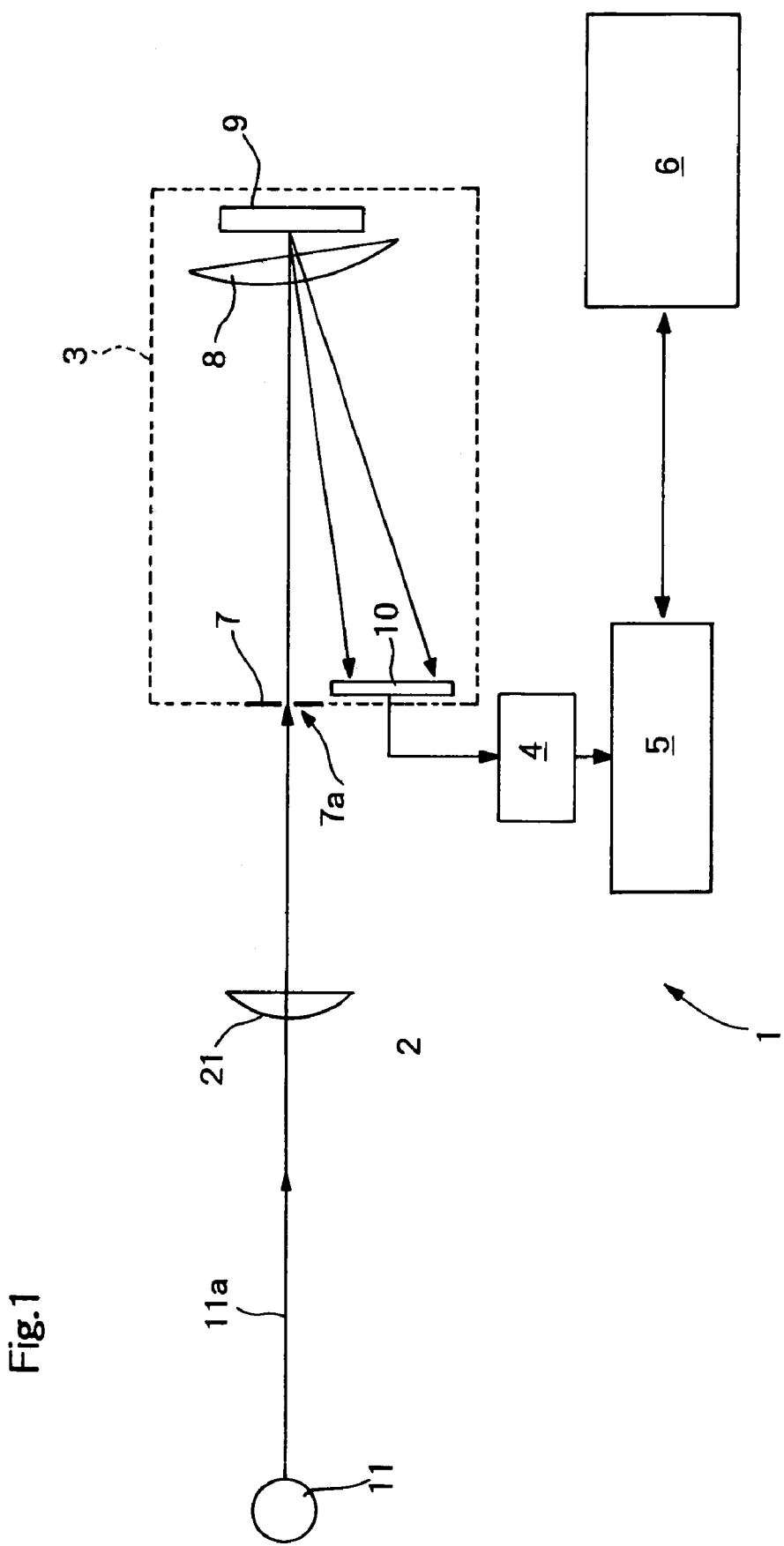
FIG. 1 is a schematic structure of a calibration method of a spectral analyzer according to the present invention.

FIG. 1 is a schematic view of the structure for the calibration method of the spectral analyzer according to the present invention. As shown in FIG. 1, the spectral analyzer 1 includes a receiving optics 2, a polychromater 3, a signal processor 4 and a control processing unit 5, and is connected to a data processing unit 6. The receiving optics 2 which includes an objective lens 21 receives a light to be measured 11a from an object to be measured 11, and makes the received light to be measured 11a incident into the polychromater 3.

The polychromater 3 (polychromater to be calibrated) disperses the incident light to be measured 11a according to the wavelength, and detects the wavelength components at the same time by receiving the dispersed light by a plurality of light receiving elements. In the present embodiment, wavelength calibration is performed on the light receiving elements of the polychromater 3. The polychromater 3 has an incident slit plate 7, an imaging lens 8, a diffraction grating 9 and a sensor array 10. The incident slit plate 7 has an incident slit 7a where the light to be measured 11a having passed through the receiving optics 2 is incident. The imaging lens 8 has the light to be measured 11a having passed through the incident slit 7a illuminate the diffraction grating 9, and forms the dispersed image of the incident slit 7a by the wavelength-dispersed light reflected by the diffraction grating 9, on the pixels of the sensor array 10. The diffraction grating 9 reflects the light of different wavelengths incident on the diffraction grating 9 in different directions. The sensor array 10 includes a plurality of light receiving elements. Specifically, the sensor array 10 is, for example, an array (pixel array) including a predetermined number of silicon photodiodes, for example forty pixels evenly spaced with a pitch of approximately 10 nm, and outputs the signal corresponding to the wavelength-dispersed image, that is, the pixel signal corresponding to the spectral distribution of the light to be measured 11a to the signal processor 4.

The signal processor 4 performs signal processing of the pixel signals inputted from the sensor array 10 to convert the pixel signals into digital signals, and outputs them to the control processing unit 5. The control processing unit 5 performs numerical processing based on the digital signals inputted from the signal processor 4 to calculate the spectral distribution of the light to be measured 11a, and converts the spectral distribution into required information. The data processing unit 6 includes a ROM (read only memory) storing control programs and the like, a RAM (random access memory) storing data for numerical processing and control processing, and a CPU (central processing unit) reading the control programs and the like from the ROM and executing them, and performs various processing. Specifically, the data processing unit 6 calculates the spectral sensitivities of the pixels of the sensor array 10 based on the spectral distribution information (digital signals) inputted from the control processing unit 5. The data processing unit 6 is, for example, a PC (personal computer), and is connected to the control processing unit 5 by predetermined communication means.

Figure 2:
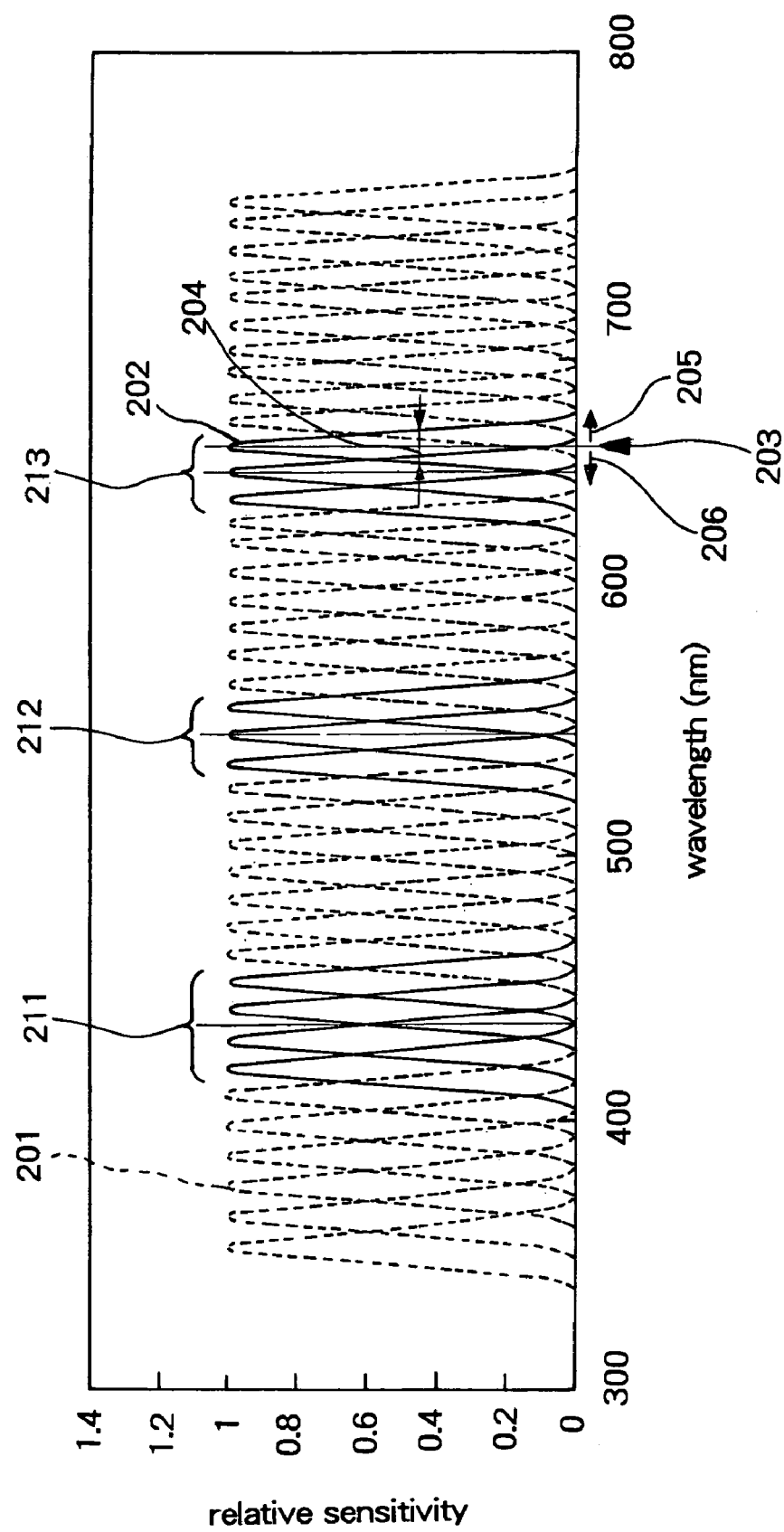
FIG. 2 is a graph showing an example of the spectral sensitivities of the pixels of a sensor array of the spectral analyzer.

FIG. 2 shows spectral sensitivities 201 (spectral characteristics) of the pixels (forty pixels in this embodiment) of the sensor array 10 characterized by the total configuration of the polychromater 3. Here, the horizontal axis represents the wavelength, and the vertical axis represents the relative sensitivity. In the spectral analyzer 1, the pixels of the sensor array 10 each have an individual spectral sensitivity as shown in FIG. 2 depending on the characteristics of the polychromater comprising incident slit plate 7, the imaging lens 8 and the diffraction grating 9. Obtaining the spectral sensitivity of each pixel of the sensor array 10, that is, obtaining the center wavelength and the half bandwidth (in case of the spectral sensitivity 202, the center wavelength 203 and the half bandwidth 204) that determine the shape (profile) of the spectral sensitivity is the wavelength calibration in the present embodiment. If the spectral sensitivity of each pixel of the sensor array 10 is given, the spectral characteristic of the light to be measured can be obtained by a known method from the pixel output in response to the light to be measured 11a.

(Description of the Principle of the Wavelength Calibration Method)

First, the principle of the wavelength calibration method in the present embodiment will be described.

<Setting of the Standard Spectral Sensitivity>

Figure 3:
FIG. 3 is an example of a spectral sensitivity table as the standard in wavelength calibration.

Prior to the wavelength calibration, as the spectral sensitivity used as the standard of the wavelength calibration of each pixel of the sensor array 10 (hereinafter, referred to as "standard spectral sensitivity"), the designed spectral sensitivity based on a simulation (optical design using ray tracing or the like) is previously generated for each of the pixels (forty pixels in the present embodiment) as a standard spectral sensitivity table as shown in FIG. 3. These tables are stored, for example, in the data processing unit 6 (spectral sensitivity table storage 61 described later). It is preferable that typical values of the spectral sensitivities of the pixels be given as the standard spectral sensitivity table.

The aforementioned standard spectral sensitivity table of each pixel gives the relative sensitivities at the wavelengths of 150 points with a pitch of, for example, approximately 0.2 nm on each side of the center wavelength of the spectral sensitivity (a wavelength range of 30 nm on each side of the center wavelength).

That is, in the case of the spectral sensitivity 202 in FIG. 2, the table gives the relative sensitivities at wavelengths of 150 points with a pitch of approximately 0.2 nm in each of the directions of the arrows 205 and 206 (directions toward the feet on both sides of the spectral sensitivity profile) with the center wavelength 203 at the center.

A shown in FIG. 3, when n is the wavelength number with a pitch of 0.2 nm, m is the pixel number and $W_{m,n}$ is the wavelength of the pixel m at the wavelength number n, the wavelength $W_{m,150}$ at n=150 which is the median value of n=0 to 300 is the standard value of the center wavelength of the pixel m (center wavelength $WC0_m$ mentioned later). The table gives the relative sensitivities (relative sensitivities $S_{m,0}$ to $S_{m,300}$) in a range of $W0_{m,0}=WC0_m-30$ nm to $WC0_m+30$ nm ($W0_{m,0}$ to $W0_{m,300}$) at n=0 to 300 where $W0_{m,n}$ is the standard value (standard wavelength) of $W_{m,n}$.

The wavelength number n of the spectral sensitivity table is not limited to n=0 to 300 (150 points on each side) but may be arbitrary values. The wavelength pitch is not limited to 0.2 nm but may be an arbitrary value. Thus, by enlarging the wavelength row of the table or changing the wavelength pitch as shown in FIG. 3, various forms of spectral sensitivities can be handled. The values in the standard spectral sensitivity tables are not necessarily designed values obtained by a simulation but may be values obtained by an actual measurement. The actual measurement is performed, for example, in such a way that single-wavelength light (monochromatic light) of a narrow half bandwidth from a monochromatic light source is successively made incident on the spectral analyzer while its wavelength is consecutively varied and the spectral sensitivity is obtained from the pixel output at each wavelength.

<Modification of the Standard Spectral Sensitivity>

As described above, the wavelength calibration is performed by obtaining the spectral sensitivity of each pixel, and according to the method of the present embodiment, the spectral sensitivity of each pixel is obtained by using the standard spectral sensitivity and the difference, that is, the deviation from the standard spectral sensitivity. In actuality, with respect to each of the center wavelength and the half bandwidth that determine the shape of the spectral sensitivity, the difference between the spectral sensitivity of each pixel of the polychromater to be calibrated 3 and the standard spectral sensitivity is obtained, and based on the differences, the standard spectral sensitivity table is modified (corrected). The standard spectral sensitivity table thus modified will be expressed as modified spectral sensitivity table as appropriate.

Figure 4:
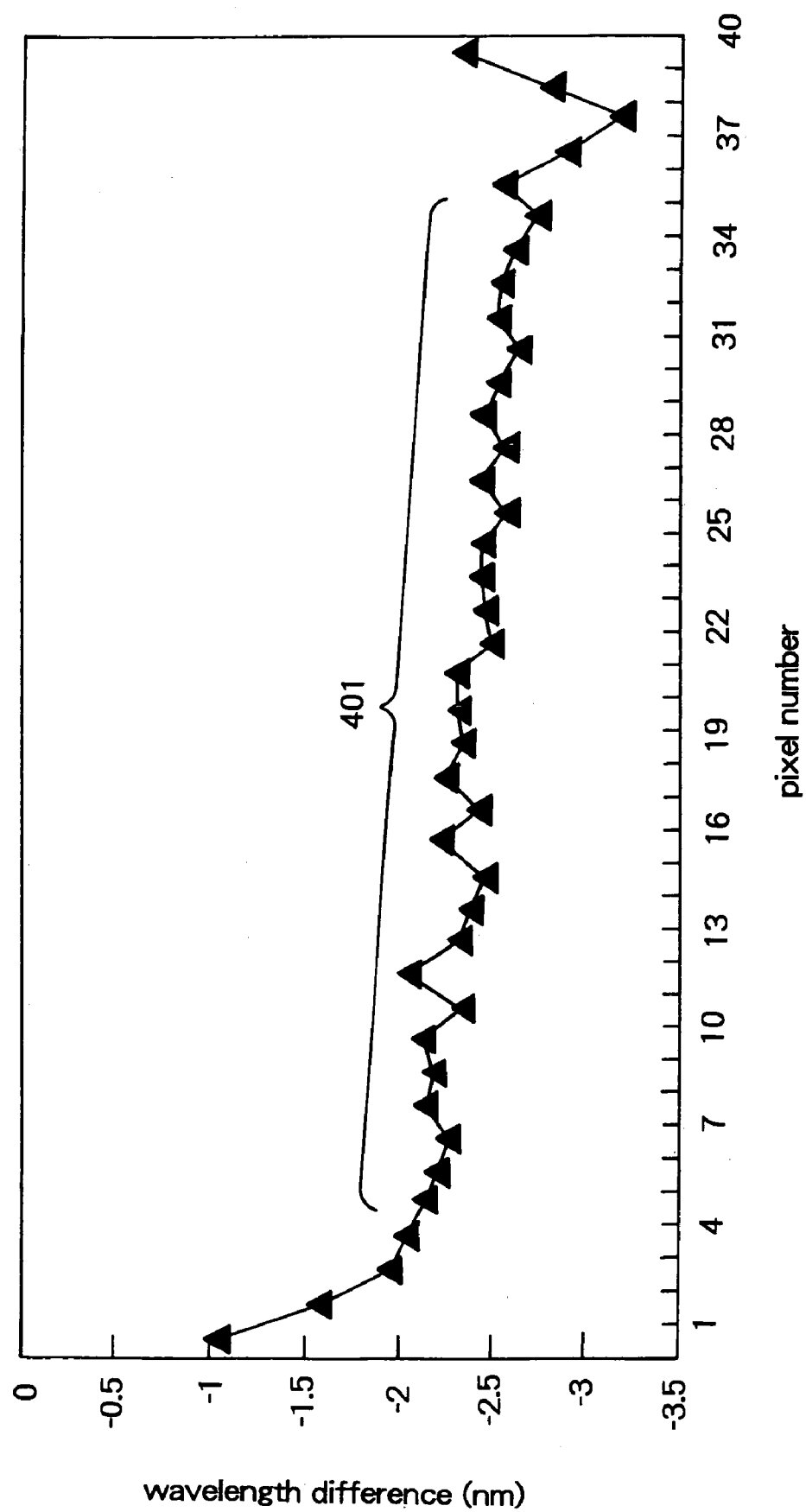
FIG. 4 is a graph showing an example of the differences in center wavelength between measured spectral sensitivities of the pixels of the sensor array of a polychromater to be calibrated and those of the standard sensitivities.
Figure 5:
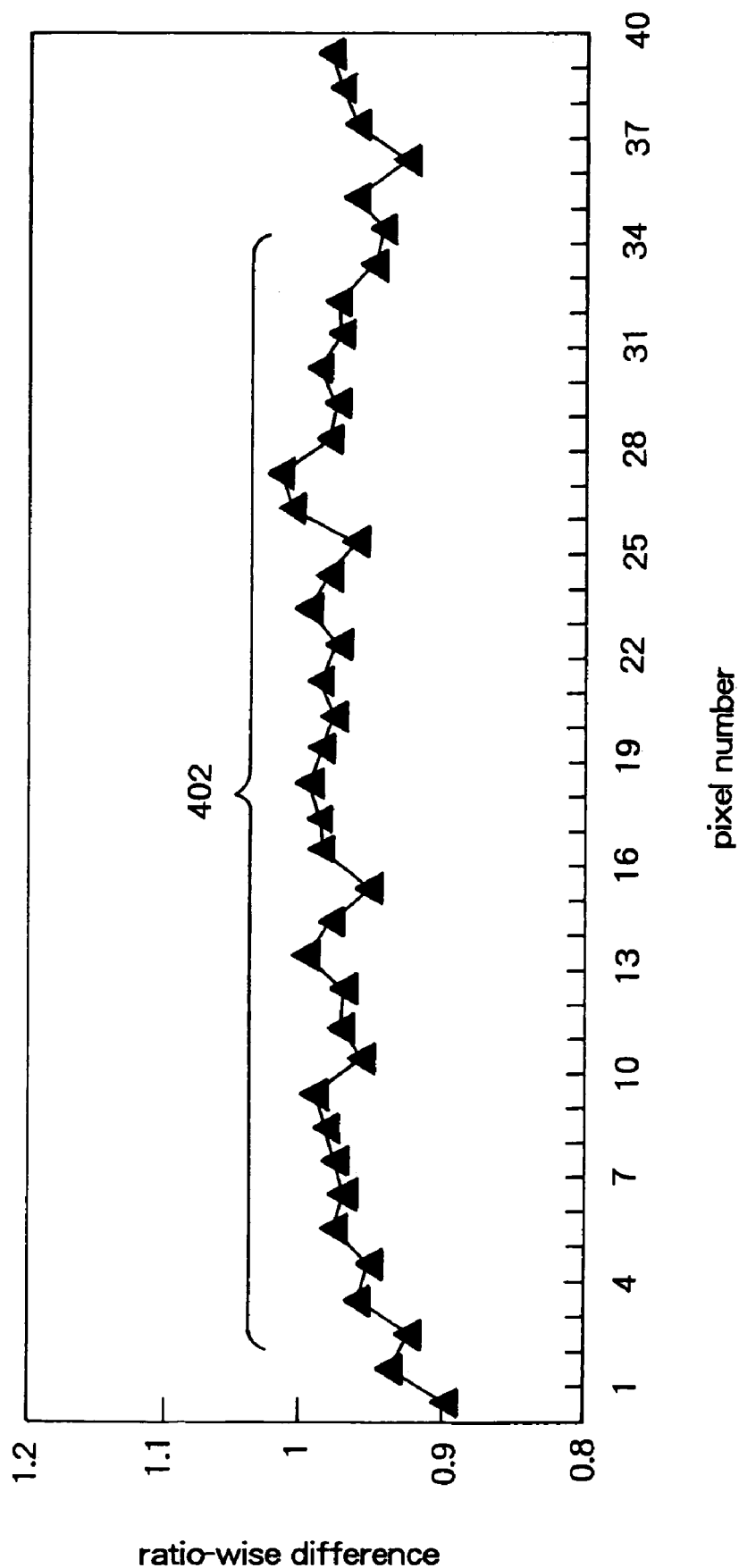
FIG. 5 is a graph showing an example of the differences in half bandwidth between the measured spectral sensitivities of the pixels of the sensor array of the polychromater to be calibrated and those of the standard sensitivities.

FIGS. 4 and 5 show the differences in center wavelength and half bandwidth between measured spectral sensitivities of the pixels of the sensor array 10 of the polychromater to be calibrated 3 and the standard spectral sensitivities. Specifically, FIG. 4 graphically shows the differences (wavelength differences) between the center wavelengths of the pixels of the pixel numbers m (horizontal axis) and the respective standard values of the center wavelengths. FIG. 5 graphically shows the differences (width ratios) between the half bandwidths of the pixels of the pixel numbers m and the respective standard values of the half bandwidths. In the center wavelengths, shift-wise differences occur since the dispersed image is shifted as a whole, for example, due to an inclination of the diffraction grating. On the other hand, in the half bandwidths, ratio-wise differences readily occur, for example, due to a shift of the image plane. For this reason, for the center wavelengths, the "differences" from the standard values are used, and for the half bandwidths, the "ratios" to the standard values are used.

Figure 9:
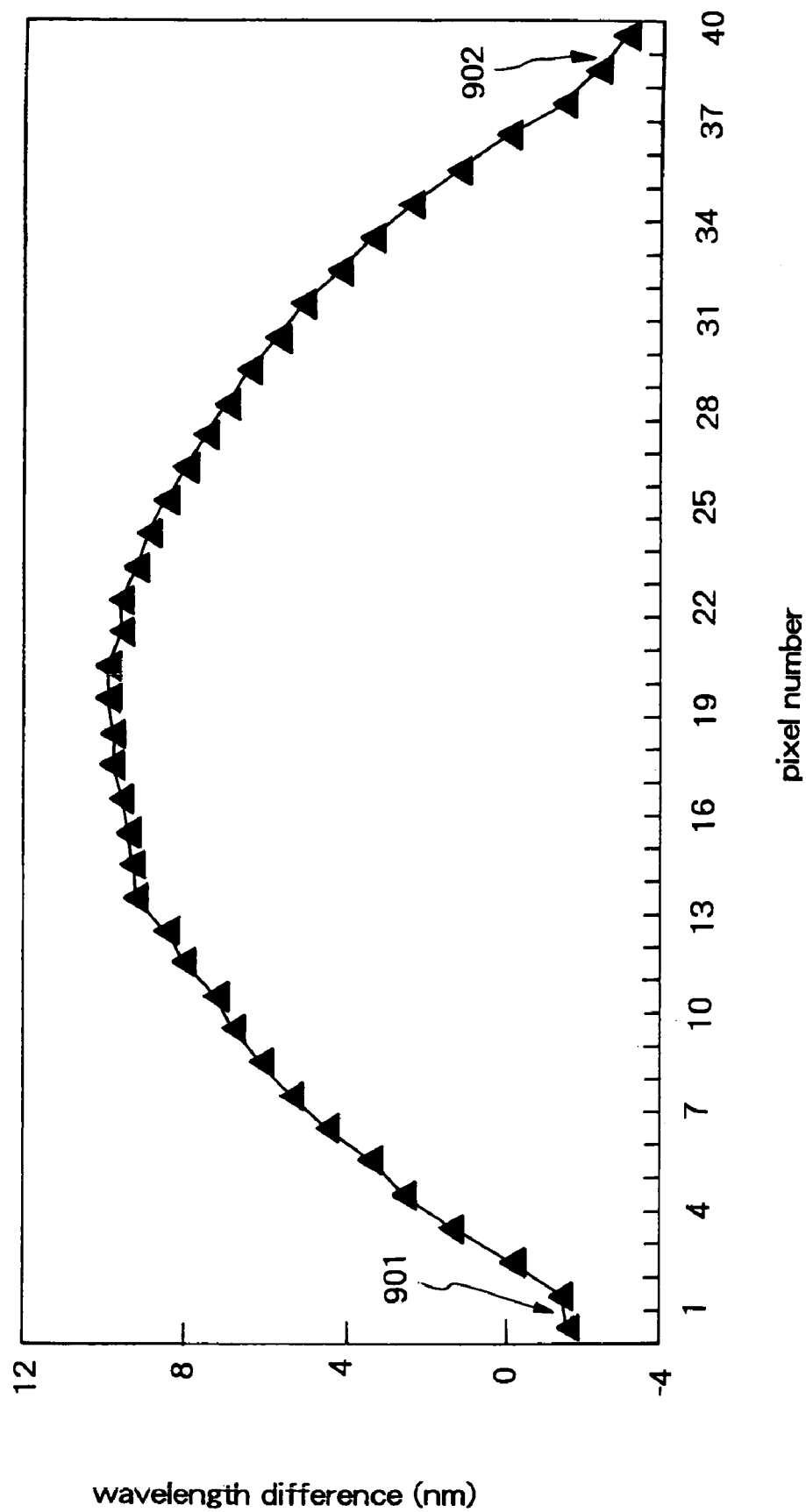
FIG. 9 is a graph showing the nonlinearity of the center wavelengths of the spectral sensitivities of the pixels with respect to the pixel number.
Figure 10:
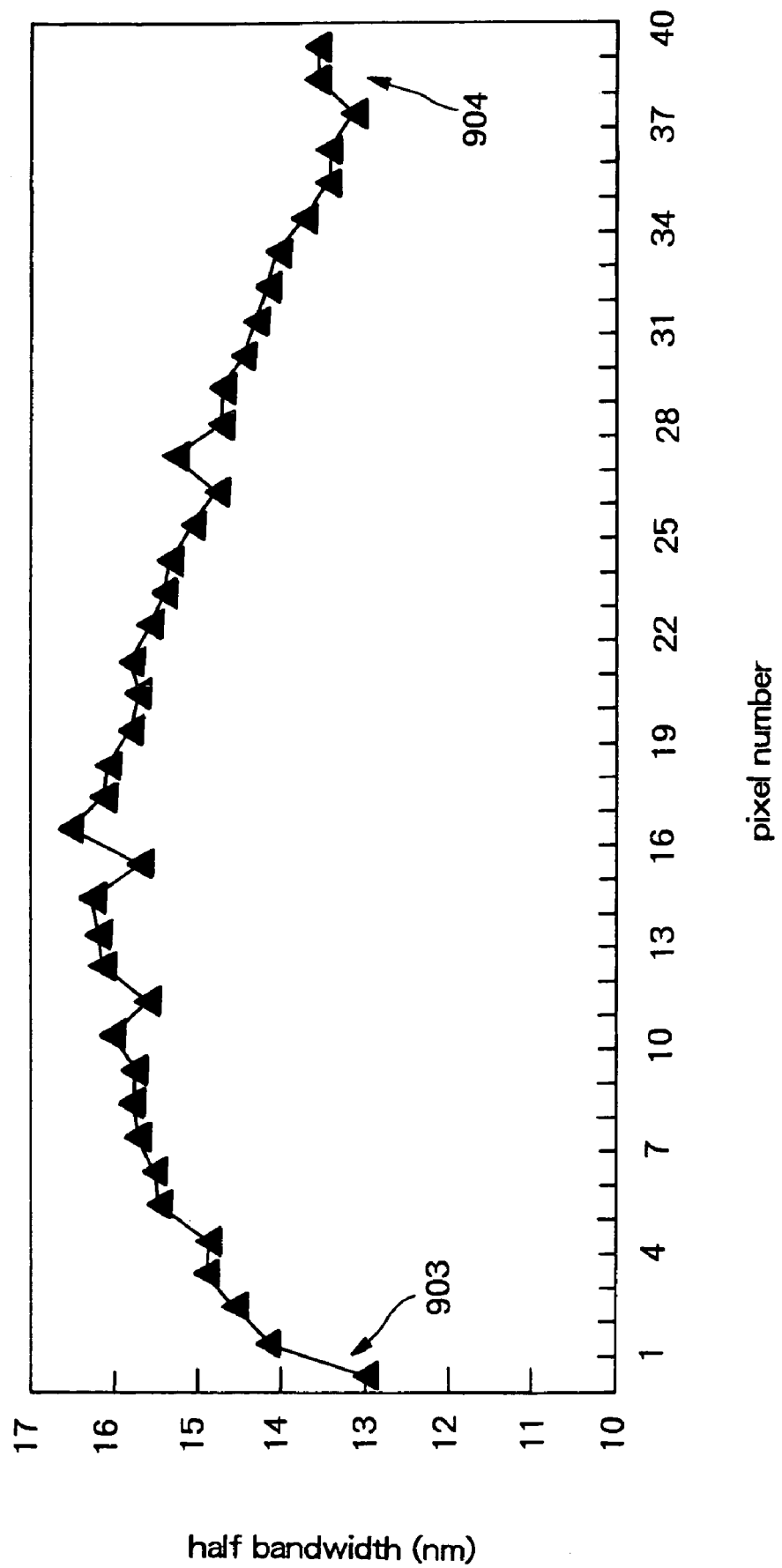
FIG. 10 is a graph showing the nonlinearity of the half bandwidths of the spectral sensitivities of the pixels with respect to the pixel number.

In contrast to FIGS. 4 and 5, the above-described FIGS. 9 and 10 shows the differences between the center wavelengths themselves and half bandwidths (wavelength widths) themselves of the spectral sensitivities of the successive pixels with respect to the pixel numbers where exist large nonlinearities. According to the wavelength calibration of prior art, the relation shown in FIG. 9 or 10 is approximated by nonlinear function such as a cubic function, and it is not easy to determine such an approximation function with a small approximation error in the entire predetermined wavelength region. Moreover, since a high-order approximation function is used, the farther from the calibration wavelength, the more readily the approximation error is enlarged. For example, in the extrapolated regions on both ends of the graphs shown at reference numerals 901 and 902 or 903 and 904 (both ends of the sensor array), the wavelength error due to a measurement error or the like is readily enlarged and accurate approximation cannot be performed.

In this respect, the nonlinearities of the differences (the wavelength differences and the width ratios) between the measured spectral sensitivity and the standard spectral sensitivity with respect to the pixel numbers of the polychromater 3 in FIGS. 4 and 5 are by far smaller than those shown in FIGS. 9 and 10. This means that most of the nonlinearity is designed nonlinearity and if the designed nonlinearity is given as the standard spectral sensitivity table, the remaining nonlinearity is much smaller. Specifically, the relations shown at reference numerals 401 and 402 are linear enough to be accurately approximated by linear functions of a pixel number. As described above, the present embodiment improves the accuracy of the approximation not by approximating the measured spectral sensitivity of each pixel of the sensor array 10 of the polychromater to be calibrated 3 as it is but by dividing the sensitivity into the typical sensitivity (standard spectral sensitivity) and the deviation from the typical sensitivity and approximating the deviation by the function of the pixel number.

The approximation of the deviation in the wavelength calibration will be concretely described using mathematical equations.

<Calculation of the Center Wavelength>

The difference $dW_m$ between the center wavelength $WC_m$ of the spectral sensitivity of the pixel number m and the standard value $WC0_m$ is given by a linear function of the pixel number m shown by the following linear equations (1) due to the good linearity of the difference $dW_m$ with respect to the pixel number as shown at reference numeral 401 in FIG. 4.

$$dW_m = A \cdot m + B \quad (1)$$

where A and B are predetermined coefficients.

As shown by the following equation (2), the center wavelength $WC_m$ of the pixel of the pixel number m is obtained by adding the difference $dW_m$ given by the equation (1) to the standard value $WC0_m$:

$$WC0_m = WC0_m + dW_m = WC0_m + A \cdot m + B \quad (2)$$

<Calculation of the Half Bandwidth>

On the other hand, the ratio $rW_m$ of the half bandwidth $WD_m$ of the spectral sensitivity of the pixel number m to the standard value is given by a linear function of the pixel number m shown by the following equation (3) due to the good linearity of the width ratio as shown at reference numeral 402 in FIG. 5.

$$RW_m = C \cdot m + D \quad (3)$$

where C and D are predetermined coefficients.

Using the center wavelength $WC_m$ and the ratio $RWm$ given by the equations (1) and (2), the wavelength $W0_{m,n}$ in the standard spectral sensitivity table is modified to the wavelength $W_{m,n}$ by the following equation (4) to create a new spectral sensitivity (the spectral sensitivity table thus modified is expressed as modified spectral sensitivity table as appropriate):

$$W_{m,n} = RW_m \cdot (W0_{m,n} - WC0_m) + WC_m$$
$$= RW_m \cdot (W0_{m,n} - WC0_n) + WC0_m + dW_m \quad (4)$$

The equation (4) indicates that when the difference $dW_m$ is given as the center wavelength correction term and the ratio $RW_m$ is given as the half bandwidth correction coefficient, the center wavelength $WC0_m$ of the pixel of the pixel number m is corrected by the center wavelength correction term $dW_m$ to $WC0_m + dW_m$ and the wavelength difference $(W0_{m,n} - WC0_m)$ between the wavelength $W0_{m,n}$ of the wavelength number n and the center wavelength $WC0_m$ is corrected by the half bandwidth correction coefficient $RW_m$ to $RW_m \cdot (W0_{m,n} - WC0_m)$. In other words, the equation (4) is an arithmetic equation for estimating the spectral sensitivity of each pixel m of the polychromater to be calibrated based on the "standard values" such as $W0_{m,n}$ (or $W0_{m,n} - WC0_m$) and the "differences" from the standard values such as the wavelength difference $dW_m$ and the width ratio $RW_m$.

Determining the coefficients A, B, C and D of the equations (1) and (3) that give the center wavelength correction term $dW_m$ and the half bandwidth correction coefficient $RW_m$ and creating the modified spectral sensitivity table (or the above-mentioned $W_{m,n}$) as described above corresponds to "the wavelength calibration" in the present embodiment.

<Optimization of the Coefficients>

For determining the optimal coefficients A, B, C and D, line spectra emitted from an Hg—Cd (mercury-cadmium) lamp (line spectrum source) as a wavelength standard whose wavelengths originated by the electronic energy states of mercury and cadmium atoms are intrinsically stable is measured by the spectral analyzer 1 (sensor array 10). At this time, a wavelength-dispersed image of the incident slit by the line spectra of the Hg—Cd lamp is formed on the sensor array 10.

Figure 6:
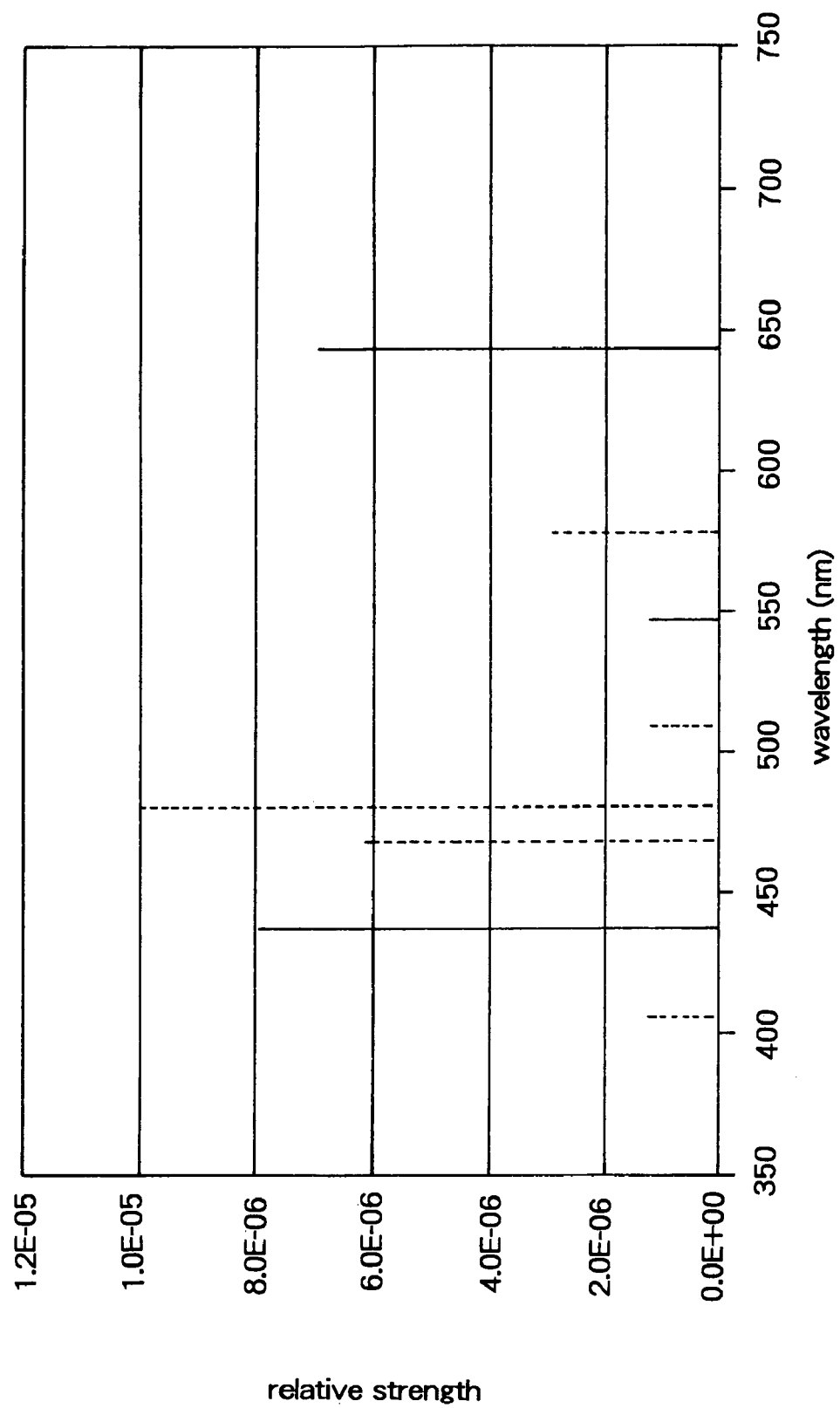
FIG. 6 is a graph showing the line spectra of a mercury-cadmium (Hg—Cd) lamp.

FIG. 6 shows the line spectra emitted from the Hg—Cd lamp. The horizontal axis represents the wavelength of the line spectra, and the vertical axis represents the relative strength of the line spectra. As shown in the figure, a plurality of line spectra is emitted from the Hg—Cd lamp. The line spectra which have comparatively high strength and are isolated from other spectra and evenly distributed in the measurement wavelength range (360 nm to 740 nm for example), such as line spectra of at 435.84 nm, 546.07 nm and 643.85 nm shown by the solid lines in FIG. 6, are used as the wavelength standards. The line spectra used as the wavelength standards will be hereinafter referred to as evaluated line spectra. Although three line spectra above are set as the standard line spectra in the present embodiment, the present invention is not limited thereto; line spectra other than the three may be set.

Then, the coefficients A, B, C and D are optimized by a least square method so that the measured relative outputs calculated from the outputs of pixels (for example, three or four pixels), among the forty pixels of the sensor array 10, that are to respond to each of the three line spectra and the calculated relative outputs of said pixels match closest to each other. Here, the measured relative outputs are calculated based on the outputs of the four pixels shown at reference numeral 211 corresponding to the evaluated line spectrum of 435.84 nm shown in FIG. 2 and the three pixels shown at reference numerals 212 and 213 corresponding to the evaluated line spectra of 546.07 nm and 643.85 nm. The calculated relative outputs are calculated from the modified spectral sensitivity table and the wavelengths of the evaluated line spectra. The calculated relative outputs based on the spectral sensitivity table shown in FIG. 3 should coincide with the measured relative outputs obtained by actually measuring the evaluated line spectra and if there is a deviation between the calculated and measured relative outputs, (a) the modification of the coefficients A, B, C and D, (b) the modification of the center wavelength and the half bandwidth and (c) the modification of the spectral sensitivity table are repeated ((a), (b) and (c) are repeated) until these coincide with each other with a predetermined accuracy.

The aforementioned measured relative outputs are measured pixel outputs normalized against the peak output for each evaluated line spectrum. That is, the measured relative outputs are the outputs of the three or four pixels that are to respond to each evaluated line spectrum relativized by being divided by the peak output of the group of the three or four pixels. Similarly, the calculated relative outputs are the outputs of the pixels corresponding to each evaluated line spectrum calculated based on the line spectrum wavelength and the modified spectral sensitivity table (calculated pixel outputs) and relativized by being divided by the peak outputs of the pixel groups for each evaluated line spectrum. Relativizing the outputs as described above enables the wavelength calibration by the line spectrum source which is unstable in the intensity although very stable in the wavelength.

Figure 7:
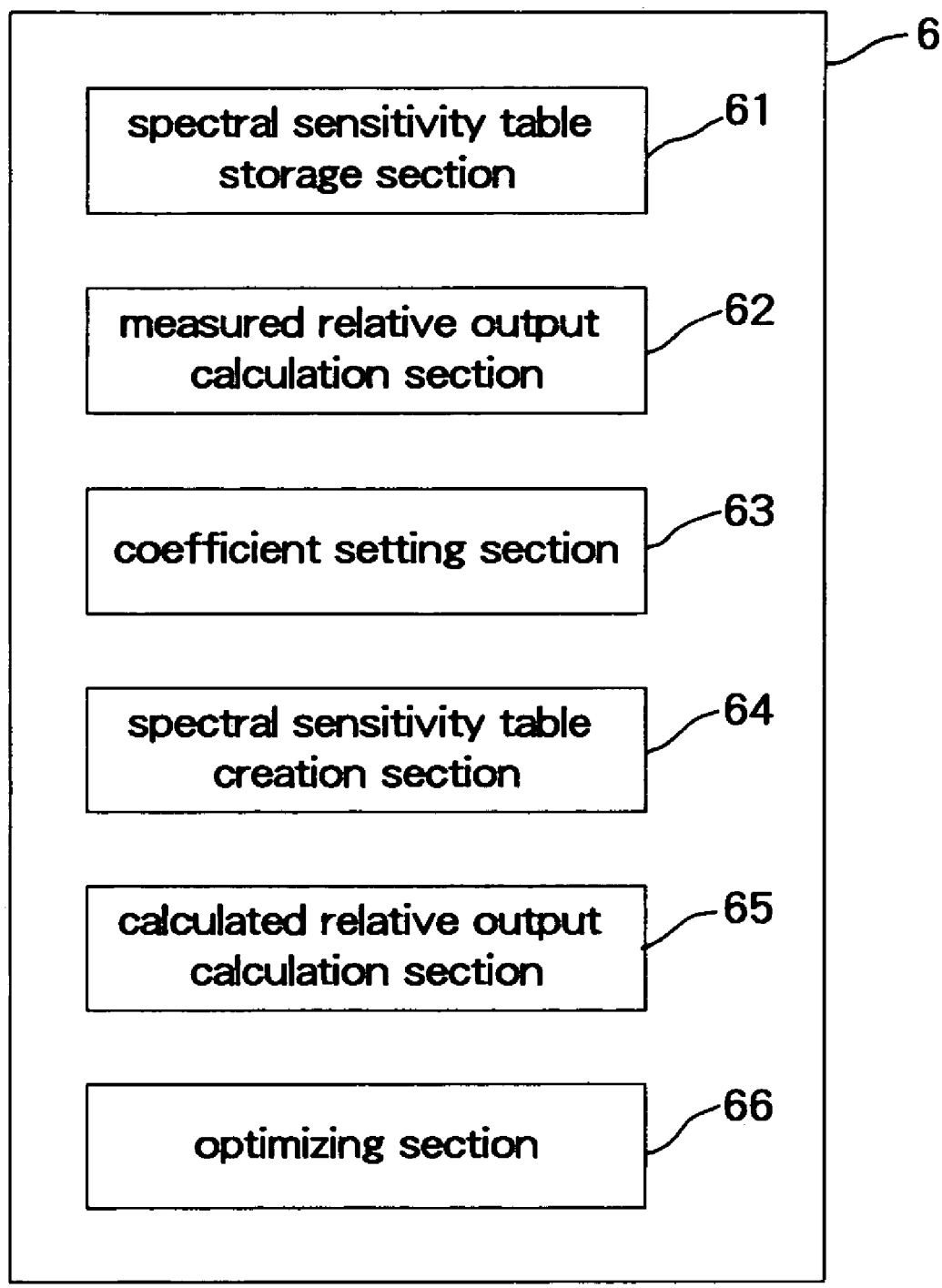
FIG. 7 is a block diagram for explaining computing function sections associated with the wavelength calibration of a data processing unit.

Now, various computational processing in the above-described wavelength calibration method will be described with respect to each functional section of the data processing unit 6. As shown in FIG. 7, the data processing unit 6 has a spectral sensitivity table storage section 61, a measured relative output calculation section 62, a coefficient setting section 63, a spectral sensitivity table creation section 64, a calculated relative output calculation section 65 and an optimizing section 66. The spectral sensitivity table storage section 61 stores a plurality of spectral sensitivity tables (standard spectral sensitivity tables and modified spectral sensitivity tables) corresponding to the pixels m as shown in FIG. 3. The spectral sensitivity table storage section 61 successively stores the spectral sensitivity tables updated in the wavelength calibration. The measured relative output calculation section 62 calculates the measured relative outputs based on the outputs from the pixels concerned with the line spectra of the Hg—Cd lamp shown in FIG. 6. The measured relative output calculation section 62 performs the relativization processing using the peak output for each evaluated line spectrum in the calculation of the measured relative outputs.

The coefficient setting section 63 sets the coefficients A, B, C and D in the linear functions of the equations (1) and (3). First, the coefficient setting section 63 sets values such that A=0, B=0, C=1 and D=0 as initial values, and in the succeeding optimizing computation, the coefficient setting section 63 successively modifies these coefficients and sets the modified coefficients. The spectral sensitivity table creation section 64 calculates the difference $dW_m$ (center wavelength correction term) between the center wavelength of each pixel m and the respective standard value and the ratio $RW_m$ (half bandwidth correction coefficient) between the half bandwidth of each pixel m and the respective standard value by the equations (1) and (3) using the coefficients set by the coefficient setting section 63. Then, the spectral sensitivity table creation section 64 creates the modified spectral sensitivity table by modifying the standard spectral sensitivity table of each pixel m using the equation (4) based on the calculated difference $dW_m$ and ratio $RW_m$. The spectral sensitivity table creation section 64 rewrites the modified spectral sensitivity tables stored in the spectral sensitivity table storage section 61 for update.

The calculated relative output calculation section 65 calculates the theoretical output values (calculated pixel outputs) of the pixels concerned with the evaluated line spectra based on the created modified spectral sensitivity tables and the wavelengths (line spectrum wavelengths) of the evaluated line spectra. Then, the calculated relative output calculation section 65 calculates the calculated relative outputs by relativizing the calculated pixel outputs by the peak output for each line spectrum. The optimizing section 66 performs optimizing computation so that the difference (the squared sum of the difference shown in an equation (5) shown later) between the measured relative outputs calculated by the measured relative output calculation section 62 and the calculated relative outputs calculated by the calculated relative output calculation section 65 is smaller than a predetermined threshold value.

Figure 8:
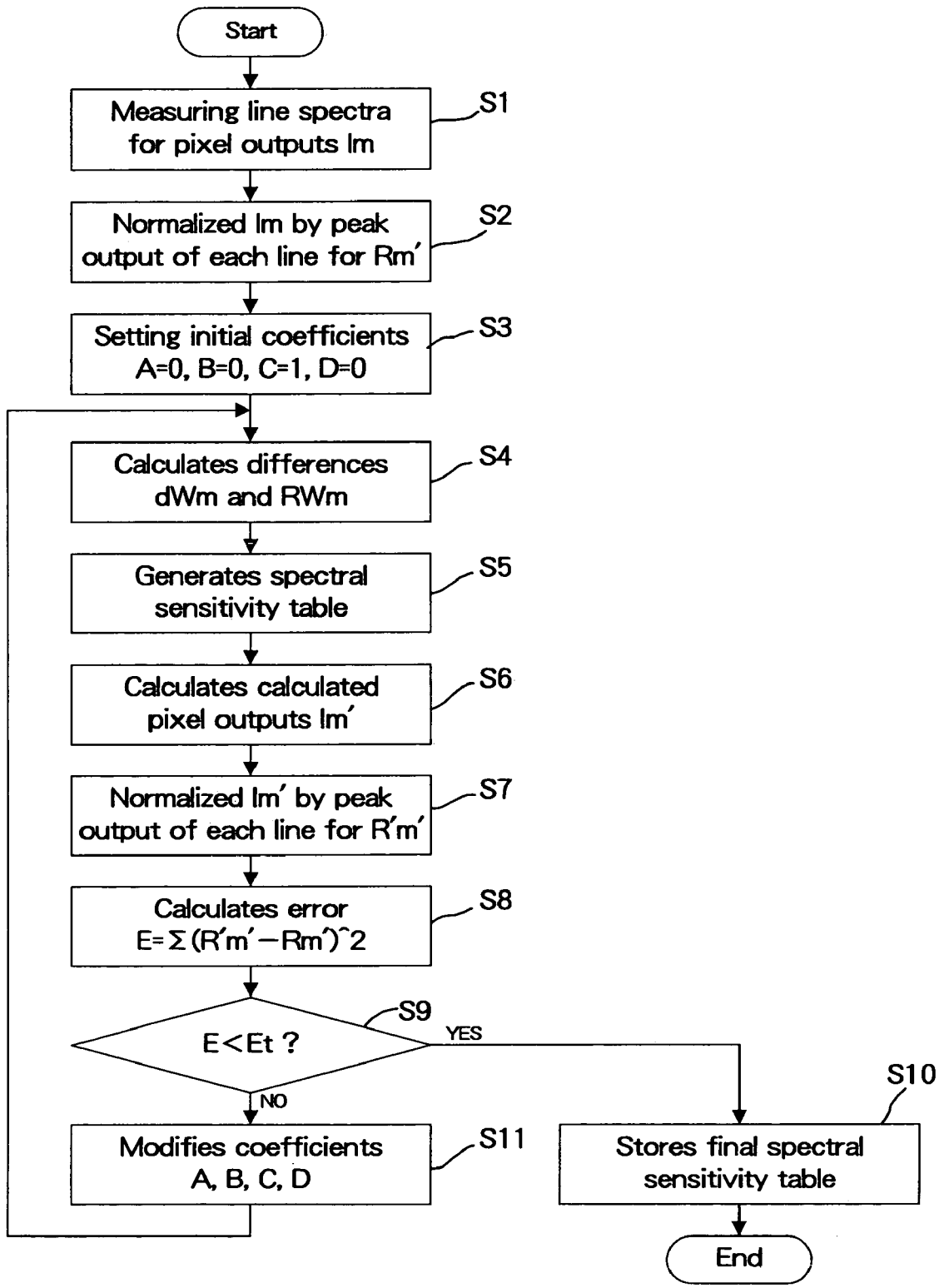
FIG. 8 is a flowchart showing an example of the operation associated with the wavelength calibration of the spectral analyzer.

FIG. 8 is a flowchart showing an example of the operation associated with the wavelength calibration of the spectral analyzer. First, the Hg—Cd lamp as the wavelength standard is set in a correct position in the spectral analyzer 1, and an output Im (measured spectral intensity Im) of each pixel of the sensor array 10 when the line spectra emitted from the Hg—Cd lamp is measured is obtained by the signal processor 4 and the control processing unit 5 (step S1). Then, an output Im' of the pixel corresponding to each of the evaluated line spectra in the pixel array of the sensor array 10 is relativized by the peak output for each evaluated line spectrum by the data processing unit 6 to thereby obtain a measured relative output Rm' (step S2). Here, m' is the pixel numbers concerned with the evaluated line spectra as in the description hereinafter.

Then, the initial values A=0, B=0, C=1 and D=1 are set as the coefficients of the linear functions of the equations (1) and (3) by the data processing unit 6 (step S3). At this time, the difference $dW_m$=0 and the ratio $RW_m$=1. Using these coefficients, the difference $dW_m$ of the center wavelength and the ratio $RW_m$ of the half bandwidth of each pixel m are calculated by the equations (1) and (3) (step S4). Using the calculated difference $dW_m$ of the center wavelength and ratio $RW_m$ of the half bandwidth, the standard spectral sensitivity table for each pixel m is modified by the equation (4) to thereby create anew spectral sensitivity table (modified spectral sensitivity table) (step S5). When the above-mentioned initial values are given as the coefficients, no modification is performed, and the modified spectral sensitivity tables equal the prestored standard spectral sensitivity tables.

The output $I_{m'}$ of the pixel m' corresponding to the evaluated line spectrum concerned is calculated from the modified spectral sensitivity table created and the wavelength (line spectrum wavelength) of the evaluated line spectrum (step S6). Then, the calculated pixel output $I_{m'}$ is relativized by the peak output for each evaluated line spectrum to thereby obtain a calculated relative output $R'_{m'}$ (step S7). Then, as shown by the following equation (5), the squared sum of the differences between the measured relative outputs $R_{m'}$ of the pixels corresponding to the evaluated line spectra and the respective calculated relative outputs $R'_{m'}$ is calculated as the error function E (step S8):

$$E=\Sigma_{m'}(R'_{m'}-R_{m'}) \qquad (5)$$

When the error function E is lower than a threshold value Et (YES of step S9), the newest modified spectral sensitivity table at the above-described step S5 is determined to be the calibration result (step S10). The modified spectral sensitivity table (calibration result) obtained by the data processing unit 6 may be stored in the control processing unit 5. When the error function E is equal to or higher than the threshold value Et (NO of step S9), the coefficients A, B, C and D are re-modified (step S11), and the process returns to step S4. Thereafter, steps S4 to S9 are repeated until the error function E becomes lower than the threshold value Et.

As described above, according to the wavelength calibration method of the spectral analyzer 1 of the present embodiment, the difference (the difference $dW_m$ and the ratio $RW_m$) between the center wavelength and half bandwidth of the spectral sensitivity of each of the pixels (forty pixels in this example) of the sensor array 10 and the preprovided respective center wavelength and half bandwidth of the standard spectral sensitivity of each of the pixels is expressed as the function of the pixel number m. Then, at least one coefficient that defines the function is obtained by measuring the predetermined wavelength standards (for example, the line spectra) by the spectral analyzer to be calibrated. The center wavelength and half bandwidth of the spectral sensitivity of each pixel are determined from the difference (the difference $dW_m$ and the ratio $RW_m$) obtained from the function defined by the determined coefficient and the respective center wavelength and half bandwidth of the standard spectral sensitivity. As described above, since the amounts approximated by the function of the pixel number m in the wavelength calibration are the differences of the center wavelengths and half bandwidths of the spectral sensitivities of the pixels from the respective standard values where the change with respect to the pixel number is moderate, the approximation can be accurately performed by simple approximation functions defined by a small number of coefficients such as the linear functions in equations (1) and (3) defined by coefficients A to D.

Since the approximation is performed by low-order functions, the accuracy of the approximation does not degrade steeply in the extrapolated regions outside the wavelength standards. Consequently, the approximation can be accurately performed in the entire predetermined wavelength region, so that the calibration of the spectral sensitivities of the pixels can be performed highly accurately.

Since the approximation functions are defined by a small number of coefficients, the coefficients can be determined based on a measurement of a small number of wavelength standards, so that the wavelength calibration processing can be simplified and expedited.

In the present embodiment, the standard values of the center wavelength and half bandwidth of the spectral sensitivity of each pixel are obtained based on a simulation or an actual measurement. Consequently, standard values from which the differences of the center wavelength and half bandwidth of the spectral sensitivity of each pixel are small can be set, so that the number of coefficients that define the function of the pixel number m giving the differences from the standard values can be reduced.

In the present embodiment, the preprovided standard spectral sensitivities (standard spectral sensitivity tables) of the pixels are modified by the estimated center wavelengths and half bandwidths of the pixels, and the modified standard spectral sensitivities (modified spectral sensitivity tables) are set as the spectral sensitivities of the pixels. That is, the standard spectral sensitivity tables are modified by the estimated center wavelengths and half bandwidths to thereby estimate the spectral sensitivities of the pixels. Consequently, the spectral sensitivities of the pixels can be highly accurately and efficiently estimated.

In the present embodiment, a spectral sensitivity modified so that the error between the measured relative outputs $R_{m'}$ obtained by actually measuring the line spectra (evaluated line spectra) as the wavelength standards by a predetermined pixels and the respective calculated relative outputs $R'_{m'}$ calculated based on the modified spectral sensitivities of the predetermined pixels and the line spectrum wavelengths is lower than the threshold value is determined to be the spectral sensitivity of each pixel.

Specifically, by using the squared sum of the differences between the measured and calculated pixel output values (see the equation (5)) as error function and performing optimizing computation until the error becomes smaller than the threshold value Et, the standard spectral sensitivity can be modified to satisfy a required accuracy, so that the spectral sensitivity of each pixel can be easily and accurately estimated.

In the present embodiment, the standard spectral sensitivity of each pixel is obtained based on a simulation or an actual measurement. For this reason, even when the spectral sensitivity of each pixel cannot be approximated by a simple mathematical function such as a Gaussian function, the spectral sensitivity of each pixel can be highly accurately estimated based on the standard spectral sensitivity.

The present embodiment can adopt the following forms:

(A) The wavelength standard is not limited to the "line spectrum" (line spectrum source) by the Hg—Cd lamp or the like, but it may be a light source whose spectral characteristic is known (whose spectral characteristic does not change). For example, a combination of an incandescent light source and a plurality of sharp-cut filters having different cut-off wavelengths, color filters having the different standard spectral transmittances or color tiles having the different standard spectral reflectances may be used as the wavelength standard.

(B) The standard spectral sensitivity (standard spectral sensitivity table) may be expressed, for example, by a mathematical function asymmetrical with respect to the center wavelength such as a Gaussian function of different half bandwidths on each side of the center. Since the shape of the Gaussian function is determined only by the center wavelength and the wavelength width, a spectral sensitivity table of a small wavelength pitch (for example, 0.2 nm) may be replaced with three data, the center wavelength and the right and left half bandwidths. Accordingly, the rewriting of the standard spectral sensitivity table is replaced with the rewriting of the center wavelength and the two half bandwidth data, so that the computing for calibration is further simplified and expedited.

(C) In the above-described embodiment, the spectral analyzer 1 has the data processing unit 6 such as a PC, and various numerical processing associated with the wavelength calibration are executed by the data processing unit 6. However, the present invention is not limited thereto; for example, the numerical processing may be executed by the control processing unit 5 without the provision of the data processing unit 6.

Although the present invention has been fully described by way of examples with reference to the accompanying drawings, it is to be noted that various change and modifications will be apparent to those skilled in the art. Therefore, unless otherwise such changes and modifications depart from the scope of the present invention, they should be construed as being including therein.

What is claimed is:

1. A method for calibrating spectral characteristics of a spectral analyzer having an incident slit, a light sensor comprising multiple pixels, and a dispersing and imaging element producing a dispersed image of said incident slit on said sensor array, the method comprising:
   obtaining a measured pixel output by measuring a plurality of line spectra of known wavelengths;
   determining coefficients which define two functions respectively approximating a relation of differences of a center wavelength and a half bandwidth of each pixel in said light sensor from a center wavelength and a half bandwidth of standard spectral characteristics of the pixel to the pixel number;
   estimating spectral characteristics of each pixel based on said differences of the center wavelength and the half bandwidth of the pixel given by said functions with the coefficients determined respectively and said standard spectral characteristics of the pixel; and
   wherein said coefficients are determined so that a pixel output estimated based on said estimated spectral characteristics of each pixel and said known wavelengths of said line spectra matches said measured pixel output.

2. The method according to claim 1, wherein said standard spectral characteristics are given by numerically simulating the optical configuration of said spectral analyzer or measuring one or more said spectral analyzers.

3. A method according to claim 1, wherein said standard spectral characteristics is modified so that the difference between relative output from pixels when measuring line spectra as wavelength standards and relative output from pixels mathematically derived based on wavelengths of said line spectra and said modified spectral characteristics of pixels is below a predetermined threshold.

4. A spectral analyzer comprising:
   an incident slit;
   a light sensor comprising multiple pixels;
   a dispersing and imaging element producing a dispersed image of said incident slit on said sensor array;
   a processor for obtaining a measured pixel output by measuring a plurality of line spectra of known wavelength;
   determining coefficients which define two functions respectively approximating a relation of the differences of the center wavelength and a half bandwidth of each pixel in said light sensor from a center wavelength and a half bandwidth of the standard spectral characteristics of each pixel to the pixel number;
   estimating spectral characteristics of each pixel based on said differences of the center wavelength and the half bandwidth of the pixel given by said functions with the coefficients determined respectively and said standard spectral characteristics of the pixel;
   wherein said coefficients are determined so that a pixel output estimated based on said estimated spectral characteristics of each pixel and said known wavelengths of said line spectra matches said measured pixel output.

5. A method for calibrating spectral characteristics of a spectral analyzer having an incident slit, a light sensor comprising multiple pixels, and a dispersing and imaging element producing a dispersed image of said incident slit on said sensor array, said method comprising:
   obtaining a measured pixel output by measuring a plurality of line spectra of known wavelengths;
   determining coefficients which define a function approximating a relation of differences of a center wavelength of each pixel in said light sensor from a center wavelength of standard spectral characteristics of the pixel to the pixel number;
   estimating spectral characteristics of each pixel based on said differences of the center wavelength of the pixel given by said function with the coefficients determined respectively and said standard spectral characteristics of the pixel; and
   wherein said coefficients are determined so that a pixel output estimated based on said estimated spectral characteristics of each pixel and said known wavelengths of said line spectra match said measured pixel output.

* * * * *